United States Patent
Scoccia

[19]

[11] Patent Number: 5,927,380
[45] Date of Patent: Jul. 27, 1999

[54] AUTOMOTIVE HEATING, AIR CONDITIONING AND VENTILATION SYSTEM WITH COMBINED MODE DOOR AND DUAL TEMPERATURE SENSOR

[75] Inventor: Ardeean Scoccia, Amherst, N.Y.

[73] Assignee: General Motors Corporation, Detroit, Mich.

[21] Appl. No.: 09/005,500

[22] Filed: Jan. 12, 1998

[51] Int. Cl.[6] .............................. F25B 29/00; B60H 1/02
[52] U.S. Cl. .............................. 165/11.1; 165/42; 165/43; 454/156
[58] Field of Search .............................. 165/11.1, 42, 43; 454/156

[56] References Cited

U.S. PATENT DOCUMENTS

| | | | |
|---|---|---|---|
| 4,143,348 | 3/1979 | Hoge | 338/28 |
| 5,025,711 | 6/1991 | Cassidy | 454/156 |
| 5,101,883 | 4/1992 | Kinmatrin et al. | 165/43 X |
| 5,152,335 | 10/1992 | Doi et al. | 454/156 X |
| 5,156,204 | 10/1992 | Doi | 165/43 X |
| 5,173,922 | 12/1992 | Arakawa et al. | 374/135 |
| 5,186,237 | 2/1993 | Adasek et al. | 165/43 X |
| 5,190,096 | 3/1993 | Taniguchi et al. | 165/43 X |
| 5,377,528 | 1/1995 | Dauvergne | 165/11.1 X |
| 5,529,112 | 6/1996 | King et al. | 165/11.1 |
| 5,727,731 | 3/1998 | Arakawa et al. | 165/43 X |
| 5,755,282 | 5/1998 | Teshima et al. | 165/43 X |

*Primary Examiner*—Ira S. Lazarus
*Assistant Examiner*—Lance Chandler
*Attorney, Agent, or Firm*—Patrick M. Griffin

[57] ABSTRACT

The individual air temperature sensors normally mounted within each outlet duct in an automatic automotive heating and air conditioning system are eliminated in favor of a dual temperature sensor incorporated directly into the swinging mode door. The door swings back and forth through the central air mix area within the housing, and one end or the other of a dual sensor mounted through the door is always exposed to the air flow before it enters an outlet duct. This presents a better location for air sensing, and reduces or eliminates the time lag involved in temperature sensing when a different duct is selected, in addition to reducing part count.

2 Claims, 7 Drawing Sheets

5,927,380

AUTOMOTIVE HEATING, AIR CONDITIONING AND VENTILATION SYSTEM WITH COMBINED MODE DOOR AND DUAL TEMPERATURE SENSOR

TECHNICAL FIELD

This invention relates to automotive heating, air conditioning and ventilation systems in general, and specifically to a housing for such a system in which a mode valve is combined with a dual temperature sensor in order to eliminate parts and improve temperature sensing.

BACKGROUND OF THE INVENTION

Automotive heating, air conditioning and ventilation systems (HVAC systems) typically incorporate a large, hollow housing behind the instrument panel, which contain a cold evaporator core and hot heater core, as well as various valves for directing air flow through them and ultimately out into the passenger compartment. Before the air enters the passenger compartment, a temperature valve divides and directs the unconditioned outside air flow through the cold and hot cores in a relative proportion designed to attain a selected final temperature, after which the air flow is directed back to a consolidated mix area where they are blended and mixed. From the mixing area, a so called mode valve directs the tempered and conditioned air flow into one or more outlets into the passenger compartment.

When the system is designed to automatically attain a final air temperature selected by a vehicle occupant, sensors in the various outlet ducts continually monitor the discharge temperature and adjust the temperature valve setting accordingly. An individual sensor and its associated wiring is needed for every duct which exits the housing and must be individually handled and routed with harnesses and connectors. In addition, since the duct sensors are located significantly downstream from the tempered air mixing area, there is an inevitable time and distance lag between air leaving the mix area and entering the selected duct or ducts. In addition, when air flow is being switched into a duct that previously had no air flow, its sensor is initially reading stagnant air before tempered air flow eventually reaches it.

SUMMARY OF THE INVENTION

The invention provides a novel combined mode valve which, in addition to reducing the number of sensor units and associated wiring, puts the sensor in a more strategically located area that improves the sensing function.

In the preferred embodiment disclosed, a typical HVAC system housing, cores, and temperature valve are used. Air flows are proportioned through the cores and consolidated back at the central mixing area. A pair of openings into a pair of outlet ducts are arranged near the central mixing area in a general V shape, relative to an axis located within the housing. A flapper door type valve has a shaft oriented on the axis, and swings back and forth, through the mix area, to either close one opening off and direct all air flow from the mix area into the other opening, or to rest between the two openings and apportion some air flow into each. A two sided, dual air temperature sensor is mounted through the flapper door, with an end of the sensor presented to the air flow on either or both sides of the door. Regardless of the position of the door, air is continually flowing from and through the central mix area, over one or both sides of the door and one or both ends of the sensor. At least one side of the sensor is always located within the mix area as the door swings through it, an ideal location to sense the temperature. Therefore, the temperature of the air in the mix area is continually monitored and known, before the air enters either or both openings and ducts. The number of sensors and associated wiring is reduced accordingly, and there is essentially no time lag in monitoring the air flow temperature in any duct.

BRIEF DESCRIPTION OF THE DRAWINGS

These and other features of the invention will appear from the following written description, and from the drawings, in which.

DESCRIPTION OF THE PREFERRED EMBODIMENT

Figure 1:
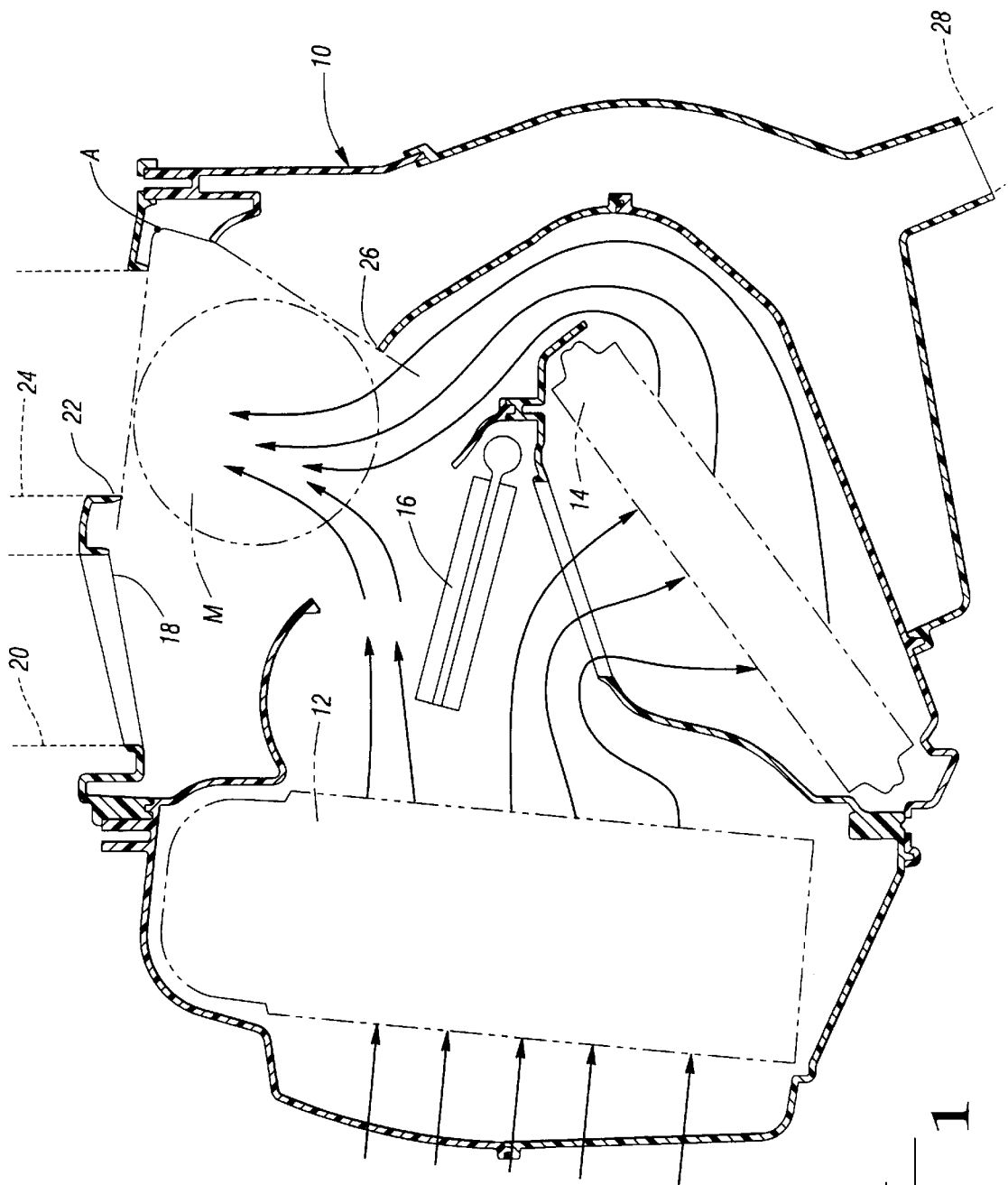
FIG. 1 is a cut away side view of a typical HVAC housing, showing the two cores, the temperature door that apportions air flow through the cores, and the various outlets from the housing that open into the various air flow ducts into the passenger compartment, which are shown by dotted lines.

Referring first to FIG. 1, a typical HVAC housing, indicated generally at 10, is a large, hollow box, generally a multi piece unit built up out of two or more molded plastic sub sections. A non illustrated blower and scroll housing draw in air and force it through the housing 10, first through an evaporator core 12, which always has air flow through it, and then toward a heater core 14. While the evaporator core 12 always has air flow through it, it may or may not be active and cold, depending on whether the compressor is active. However, it is always cold relative to the heater core 14, which always has hot engine coolant circulating through it. However, the heater core 14 does not always have air flowing through it. It may have none, some, or all of the air flow from evaporator core 12 pass through it, depending upon the position of a flapper type temperature door 16. Temperature door 16, when down, bypasses all air flow around heater core 14, when up, sends all air flow through it, and in a mid position, apportions some air flow through and some around. The air flow passing through the relatively cold evaporator core 12, and the separate flow (if any) diverted through the hot heater core 14, are consolidated at a central mix area, indicated generally by the dotted area labeled "M". There, the two flows mix to achieve a final net temperature. From there, the tempered air flow is routed to one of several possible ducts, indicated by dotted lines, which are connected to outlet openings in the housing 10. Specifically, an uppermost opening 18 and duct 20 (generally called the window defroster duct), a mid level opening 22 and duct 24, and a lower opening 26 and duct 28, all present possible entry paths for air from the mix area M into the passenger compartment. Two of the outlet openings, 22 and 26, are arrayed with the planes of their edges in a general V shape, relative to an interior axis A, as shown by the dotted lines. The various doors used to select these possible ducts and openings are described below.

Figure 2:
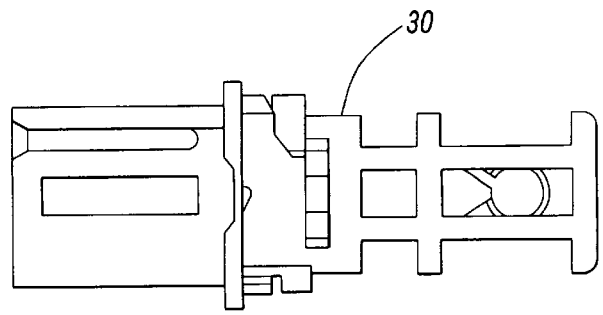
FIG. 2 shows a prior art, single sided air temperature sensor.

Referring next to FIGS. 1 and 2, it is obvious that the net temperature of the air flowing from the central mix area M into any selected duct will depend on the position of the temperature door 16 and how much is diverted through or bypassed around the heater core 14. While the temperature door 16 may simply be set manually, and directly adjusted by the vehicle occupant to achieve hotter or cooler air, automatic systems are increasingly common. In an automatic system, the operator enters a selected temperature to the control system, and a conventional air flow temperature sensor 30 in each duct, shown in FIG. 2, monitors the air flow temperature. The door 16 is moved in response to the measured temperature to provide more or less flow through the heater core 14. Clearly, a sensor 30, and its associated wiring and connectors, is needed for each duct, three in this case. Twice as many would be needed for a so called dual zone system, which divides the system into separate driver and passenger sections. The wiring must be separately routed outside the housing 10 from each separate interior duct location. Further, since each sensor 30 is located downstream within the duct interior, as flow is switched from a previously closed into a newly opened duct, there is an inevitable time lag before flow temperature can be sensed, rather than continual air flow temperature sensing.

Figure 3:
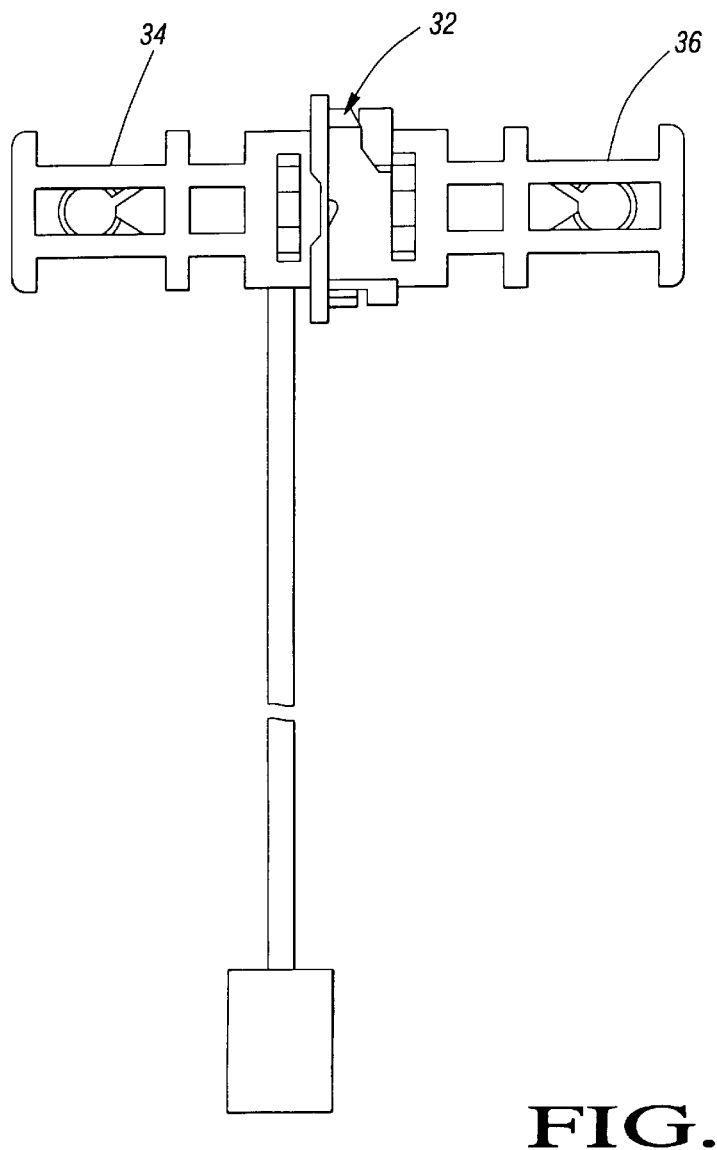
FIG. 3 shows a two sided air temperature sensor as used in the subject invention.
Figure 4:
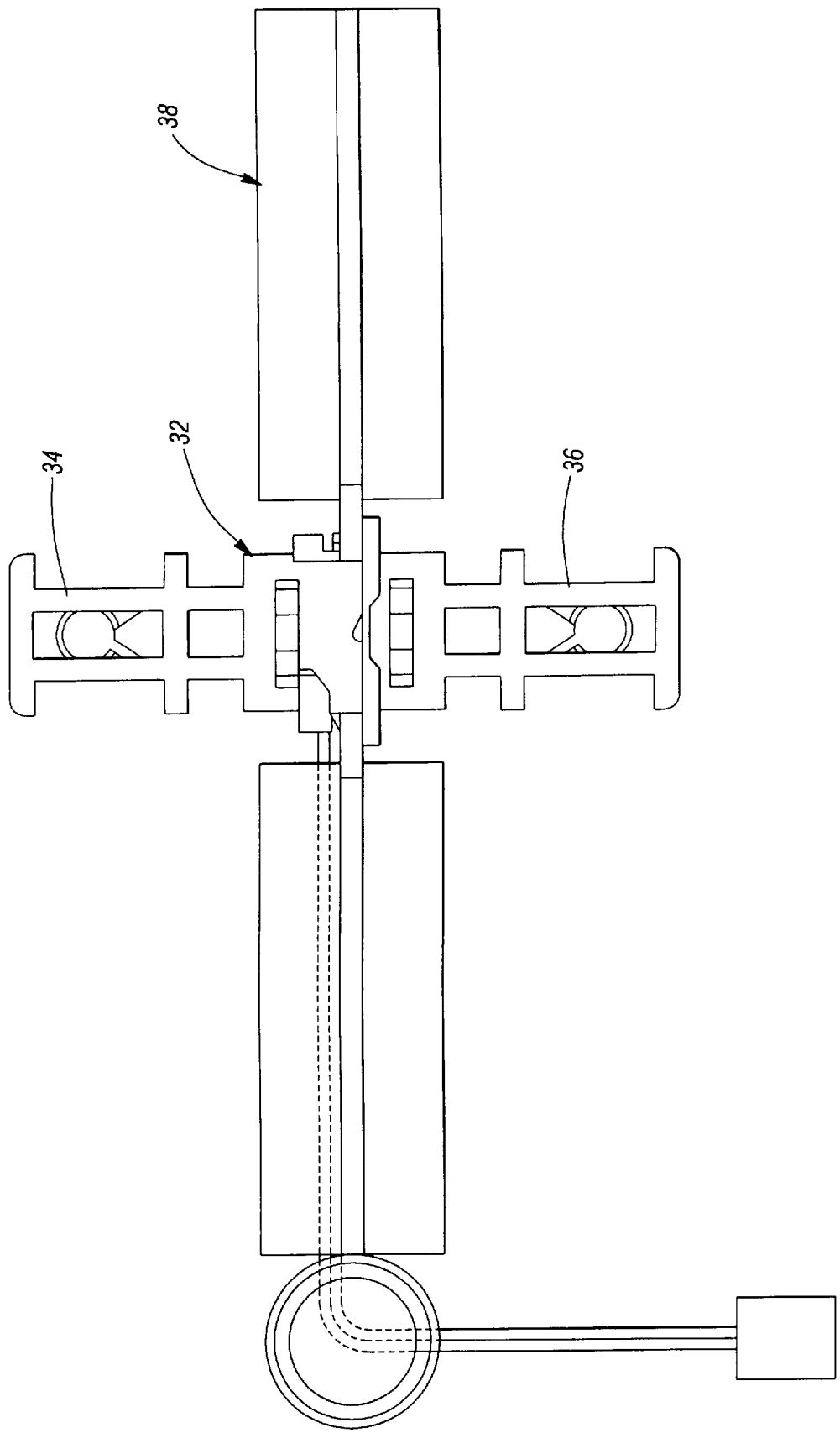
FIG. 4 shows a mode door incorporating the two sided sensor.

Referring next to FIGS. 3 and 4, the invention incorporates a novel combined valve door and two sided temperature sensor that reduces total part count and complexity, as well as providing for continual air flow temperature sensing directly in the central mix area, rather than within each individual duct. A seen in FIG. 3, the new dual sensor unit, indicated generally at 32, has first and second sensors 34 and 36, each of which is essentially comparable to a conventional single sensor 30, and works the same way. However, rather than separate wiring for each side, one three conductor wire (two hot wires and a common ground) serves for both sensors 34 and 36. Dual sensor unit 32 is mounted centrally to and through a flapper type door 38, with one sensor 34 and 36 extending to either side thereof. The three wires are run along (or centrally through) the shaft of door 38, and exit the housing 10 at a single location. Door 38 with the two sided sensor 32 is able to provide the sensing functions previously provided by multiple individual duct sensors, as described next.

Figure 5:
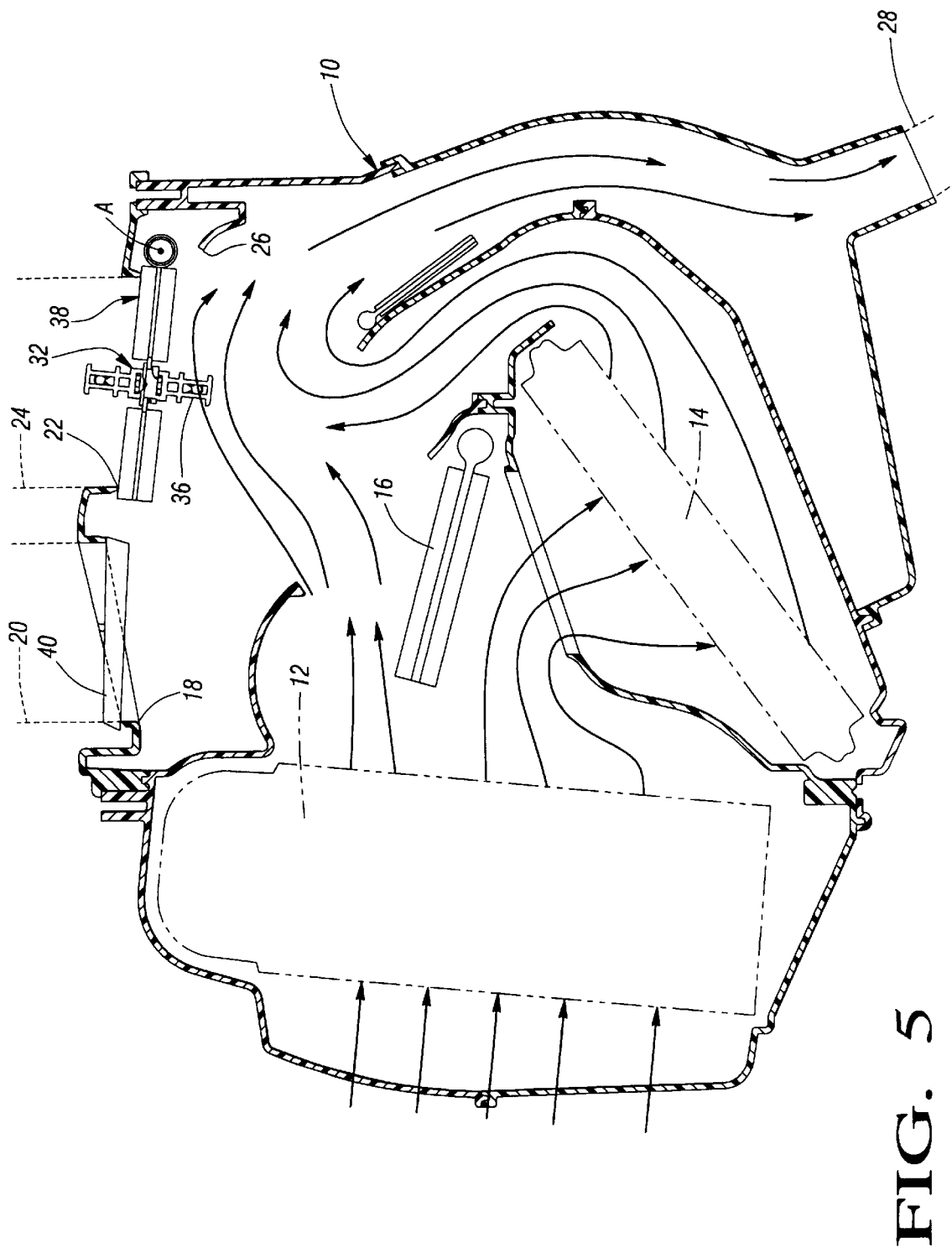
FIG. 5 shows the mode door in an upward position, closing off one duct completely and opening one completely, and presenting one side of the sensor to the mixed air flow.

Referring next to FIG. 5, door 38 is arranged to rotate back and forth on the axis A, moved by conventional pneumatic or motor actuators, not illustrated. Door 38 can move between limit positions closing either opening 22 or 26 completely, or a mid position leaving both open, as selected by an operator in the passage compartment. The wiring attached to sensor 32 is flexible enough to absorb the small degree of twisting resulting from the back and forth swinging of door 38. In addition, an independent butterfly type door 40 (generally called a defroster door) opens or closes off upper opening 18, and an independent lower duct door 42 opens or closes off lower duct 28. The doors 40 and 42 would also be moved by conventional actuators. The operator chooses a duct or ducts based on the desired exit point for tempered air, the various choices of which are often referred to as various "modes." Therefore, since the door 38 is the primary mechanism to select among the various available ducts, it is often called a "mode" door. As illustrated in FIG. 5, door 38 is in an up position, shutting off the mid level opening 22 and duct 24, while leaving lower duct 28 open (with door 42 open, as well). The sensor 36 is thereby located directly in the central mix area. Defroster duct door 40 is closed, as well, leaving lower duct 28 as the only open outlet into the passenger compartment. This is typically called the "heating" mode, although the air being discharged might not be heated at all, depending on the position of temperature door 16. Whatever the position of temperature door 16, the air flowing from the central mix area moves continually past and through the sensor 36, upstream of and before being directed into duct 28 (or any selected duct). Therefore, when the operator selects heating mode, the temperature of air to be discharged to duct 28 is immediately available, before ("before" in both the temporal and spatial sense) it enters duct 28. Any sensing time lag is essentially eliminated.

Figure 6:
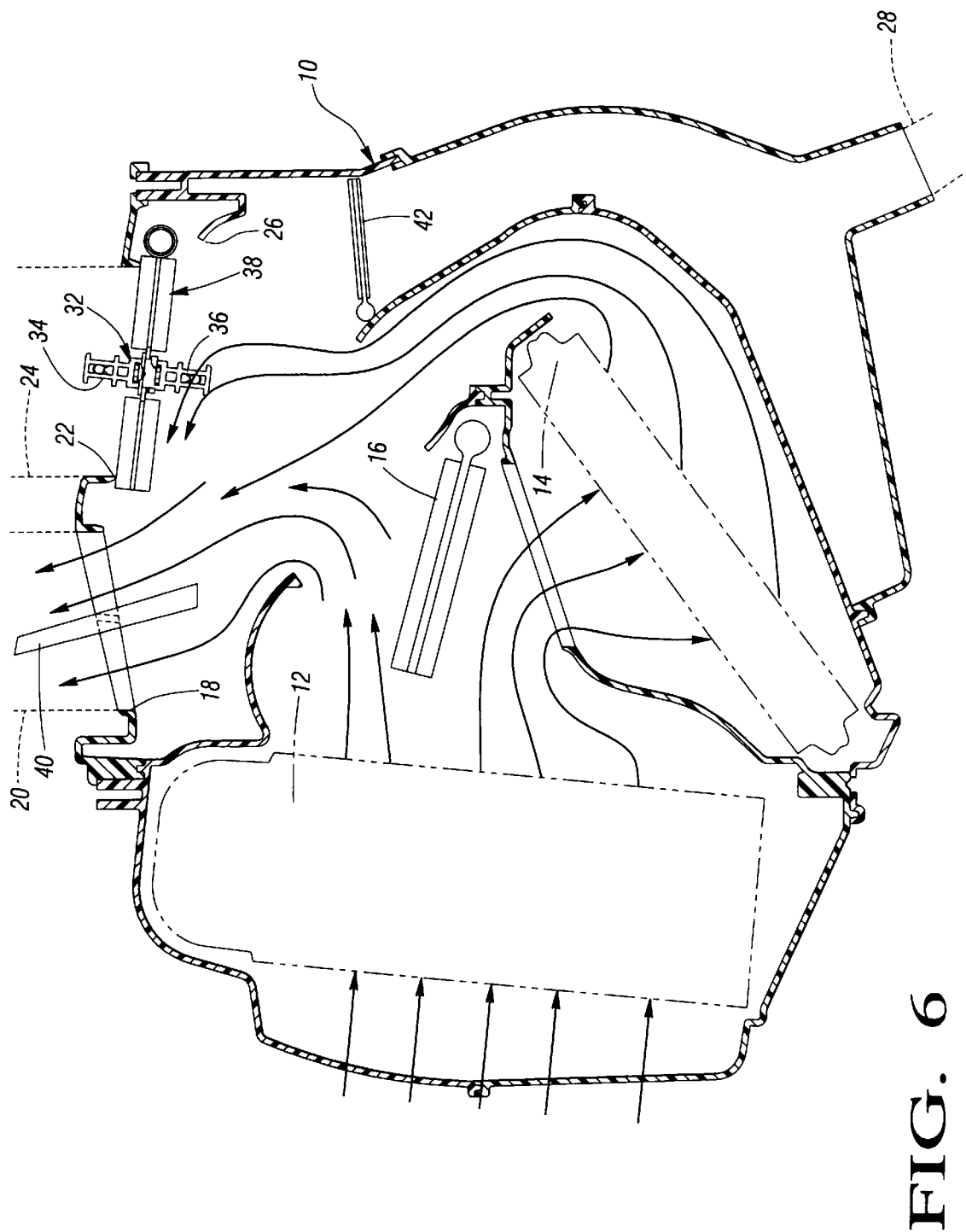
FIG. 6 shows the mode door in the same position as FIG. 5, with the previously closed duct closed by an independent door and an alternative duct independently opened.

Referring next to FIG. 6, mode door 38 is still in its FIG. 5 up position, but the defroster door 40 has been opened and the door 42 closed to block off duct 28. In this so called defrost mode, all air is forced up and through the windshield defrost duct 20. That air will generally be highly heated, so that temperature door 16 would be at least in a mid level position, if not up completely. However, evaporator core 12 would not necessarily be deactivated, and might in fact be operative, in order to dry the outside air flow through condensation before it is reheated in heater core 14. Regardless of the ultimate air temperature, however, it will still be routed by and through the sensor 36, so that the temperature of air headed toward the defroster duct 20 will be continually measured before reaching it, with no need for a separate sensor in duct 20 and upstream of opening 18. Again, part count is reduced, while the sensing location and operation is improved.

Figure 7:
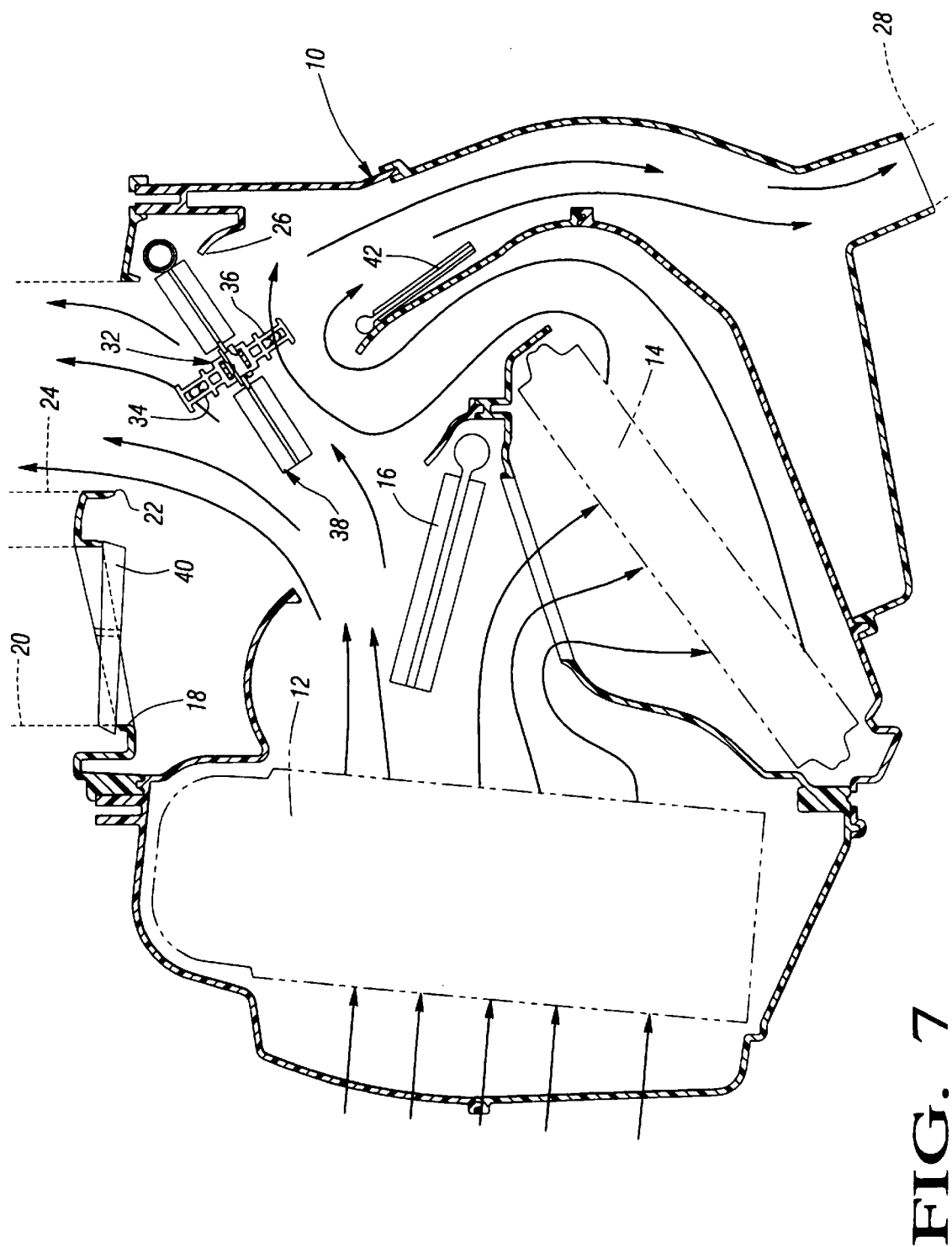
FIG. 7 shows the mode door in a mid position, apportioning flow to two ducts and presenting both sides of the sensor to the mixed air flow.

Referring next to FIG. 7, mode door 38 had been moved to a mid level position, defroster door 40 closed and door 42 opened. Both sensors 34 and 36 are now located within the central mix area, and air can flow to and past both sides thereof, into both ducts 24 and 28. This is often referred to as a "bi level" mode, since some air is being directed to both a high and low level within the passenger compartment. As before, the tempered air is temperature sensed continually and before it goes into each duct 24 and 28. Since the air from the central mix area is basically a single temperature, the control system could be designed to read either sensor 34 or 36, or to read an average thereof.

Figure 8:
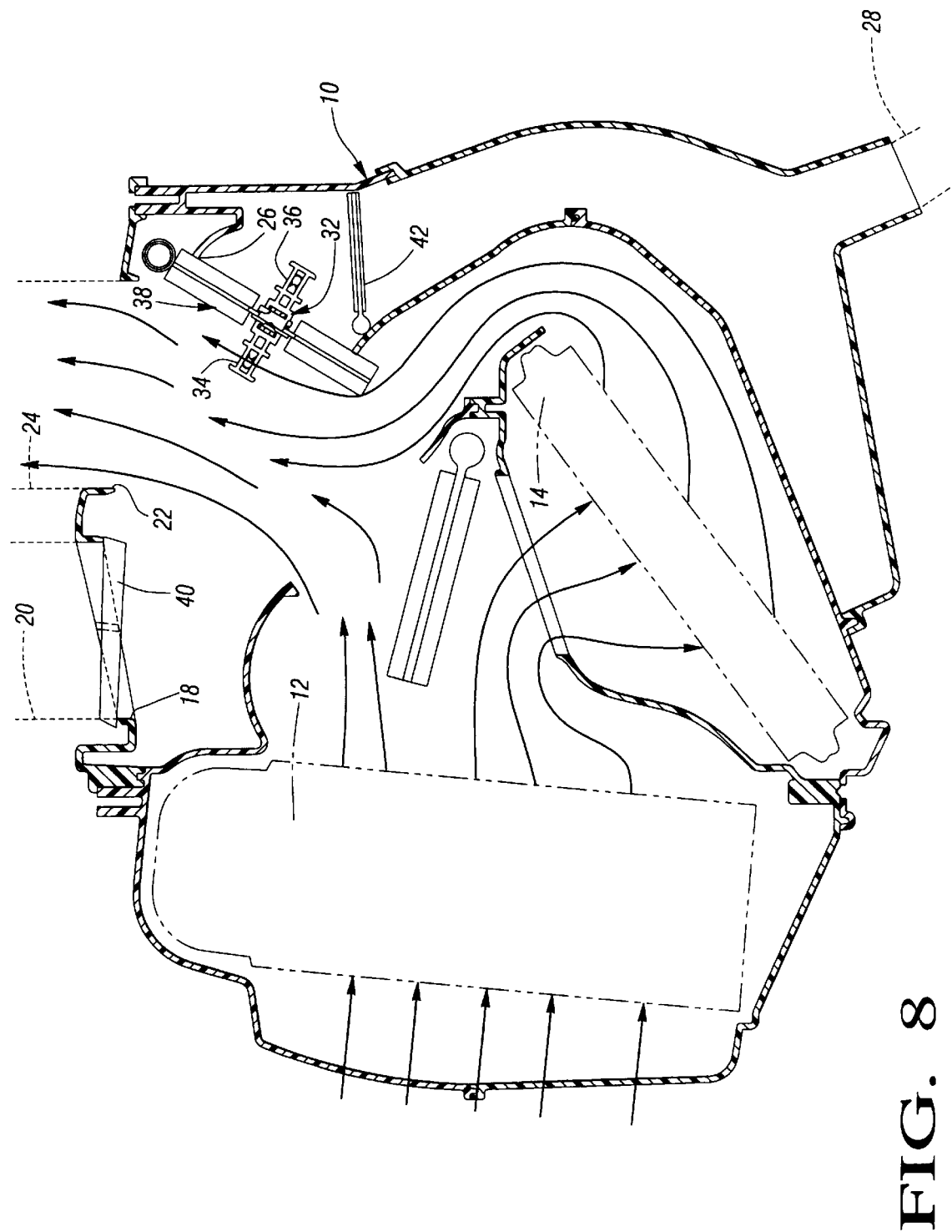
FIG. 8 shows the mode door in a downward position, opposite to the FIG. 5 position.

Referring finally to FIG. 8, mode door 38 had been moved all the way down to block off opening 26 and duct 28. Now, only the sensor 34 is located with the central mix area. With defroster door 40 closed, all air is directed to the mid level duct 24. This is typically referred to as the air conditioning mode, but the temperature of the air so directed can be any temperature, not just colder than ambient. In moving from either the FIG. 6 or FIG. 7 modes to the FIG. 8 mode, it will be seen that there is continual, lag free monitoring of the air flow temperature, because there is always at least one side of the sensor unit 32 presented to the air flow. Furthermore, the air flow being sensed is flow directly in the central mix area, rather than downstream therefrom within the interior of a duct.

In conclusion, the invention reduces the part count needed to sense temperature, while simultaneously improving both the location and the timing of the temperature sensing process. Sensors of a different type could be used, so long as they were located on, or incorporated in, the mode door and thereby located within, and continually within, the central mix area, which is the optimal location for the sensing. Sensors could be designed to be more directly integrated into the side surfaces of the door, as opposed to simply adding two of the type of sensors that are normally mounted through the walls of the duct. However, the extension of the ends of the sensors 34 and 36 above the side surfaces of the door 38 does help to assure that the sensors are well within the air stream flowing through the central mix area. Therefore, it will be understood that it is not intended to limit the invention to just the embodiment disclosed.

I claim:

1. In an automotive heating, air conditioning and ventilation system housing containing an evaporator core and a heater core through which outside air is divided and routed in a relative proportion determined by a temperature valve in order to achieve a selected net final temperature after consolidation at a central mixing area before being further routed to a selected one of, or in a selected proportion to both of, a pair of outlet ducts, a combined mode valve and dual temperature sensor for selectively routing said net final temperature air to said outlet ducts while simultaneously continuously monitoring the temperature of air being routed thereto, comprising:

a pair of outlet duct openings in said housing opening from said central mixing area into said outlet ducts, said openings being oriented in a general V shape relative to an axis located within said housing; and a flapper door type valve having a rotatable shaft oriented on said axis and adapted to swing back and forth so as to close one or the other of said outlet ducts, or to rest in between so as to divide airflow proportionately into each duct, said valve having a dual air temperature sensor incorporated in each side thereof, so that air flowing through said mixing area and into said ducts will pass one or both sides of said door and dual sensor before entering said ducts so as to be continually monitored.

2. In an automotive heating, air conditioning and ventilation system housing containing an evaporator core and a heater core through which outside air is divided and routed in a relative proportion determined by a temperature valve in order to achieve a selected net final temperature after consolidation at a central mixing area before being further routed to a selected one of, or in a selected proportion to both of, a pair of outlet ducts, a combined mode valve and dual temperature sensor for selectively routing said net final temperature air to said outlet ducts while simultaneously continuously monitoring the temperature of air being routed thereto, comprising:

a pair of outlet duct openings in said housing opening from said central mixing area into said outlet ducts, said openings being oriented in a general V shape relative to an axis located within said housing; and a flapper door type valve having a rotatable shaft oriented on said axis and adapted to swing back and forth so as to close one or the other of said outlet ducts, or to rest in between so as to divide airflow proportionately into each duct, said valve having a dual air temperature sensor extending to each side thereof, so that air flowing through said mixing area and into said ducts will pass one or both sides of said door and dual sensor before entering said ducts so as to be continually monitored.

* * * * *